Jan. 12, 1971   C. J. INGRAM   3,554,844
TYING DEVICE

Filed April 7, 1969   7 Sheets-Sheet 1

INVENTOR.
CHARLES J. INGRAM

BY
ATTORNEYS

Jan. 12, 1971   C. J. INGRAM   3,554,844
TYING DEVICE

Filed April 7, 1969   7 Sheets-Sheet 2

INVENTOR.
CHARLES J. INGRAM
BY Fulwider, Patton, Rieber
Lee and Utecht
ATTORNEYS Fig. 4  Fig. 5  Fig. 6  Fig. 10

INVENTOR.
CHARLES J. INGRAM
ATTORNEYS

Jan. 12, 1971  C. J. INGRAM  3,554,844
TYING DEVICE

Filed April 7, 1969

INVENTOR.
CHARLES J. INGRAM

BY

ATTORNEYS

United States Patent Office 3,554,844
Patented Jan. 12, 1971

3,554,844
TYING DEVICE
Charles J. Ingram, 880 Grossmont,
El Cajon, Calif. 92020
Continuation-in-part of application Ser. No. 552,002,
May 23, 1966. This application Apr. 7, 1969, Ser.
No. 826,041
Int. Cl. B32b *31/18;* B31f *5/04;* B29c *17/04*
U.S. Cl. 156—522                                    22 Claims

ABSTRACT OF THE DISCLOSURE

Apparatus for tying a plurality of objects, such as electrical wires in a bundle including a frame which forms a tape track that substantially encompasses the objects. The excess tape is pulled back from the track to tighten the tape around the objects and a bonding agent is then applied to the outward surface of the extended tape end and the feed tape is pressed overlappingly against said end. The feed tape is then sheared from the tape that has been bonded around the objects and the clamp is subsequently released.

The device for carrying out the above described method includes a frame which forms a tape track that substantially encompasses the objects. A tape feed means is provided to drive the tape around the tape track and a clamp is provided for clamping the leading extremity of the tape. Tightening means is provided to tighten the tape around the objects by pulling the excess tape back from the track to tighten the encompassing tape around the objects. The device includes an applicator for applying a bonding agent to the outward face of the leading end of the tape and a cutter is provided for severing the tape bonding the objects from the feed tape. A control mechanism is included for actuating the drive means, tightening means, applicator and cutter.

This application is a continuation-in-part of application Ser. No. 552,002, filed May 23, 1966, now abandoned, and relates to a method and apparatus for tying a plurality of objects, such as electrical wires, in a bundle.

BACKGROUND OF THE INVENTION

Field of the invention

The present invention relates to tying devices.

Description of the prior art

There are no conventional tying devices known to applicant which can be conveniently utilized to wrap a flexible tape around a bundle of objects and bond ends of the wrapped tape together.

SUMMARY OF THE INVENTION

A method and apparatus for feeding a tape around a closed track which encompasses the objects to be tied, then clamping the leading end of the tape and withdrawing the excess tape, applying an adhesive to such leading end, pressing the overlapping portions of the tape together and then cutting the tape surrounding the bundle from the feed tape.

Other features and the advantages of the present invention will be apparent from the following description, reference being had to the accompanying drawings wherein preferred embodiments are illustrated.

DESCRIPTION OF THE PREFERRED EMBODIMENTS

General description

Figures 4, 5, 6, 10:
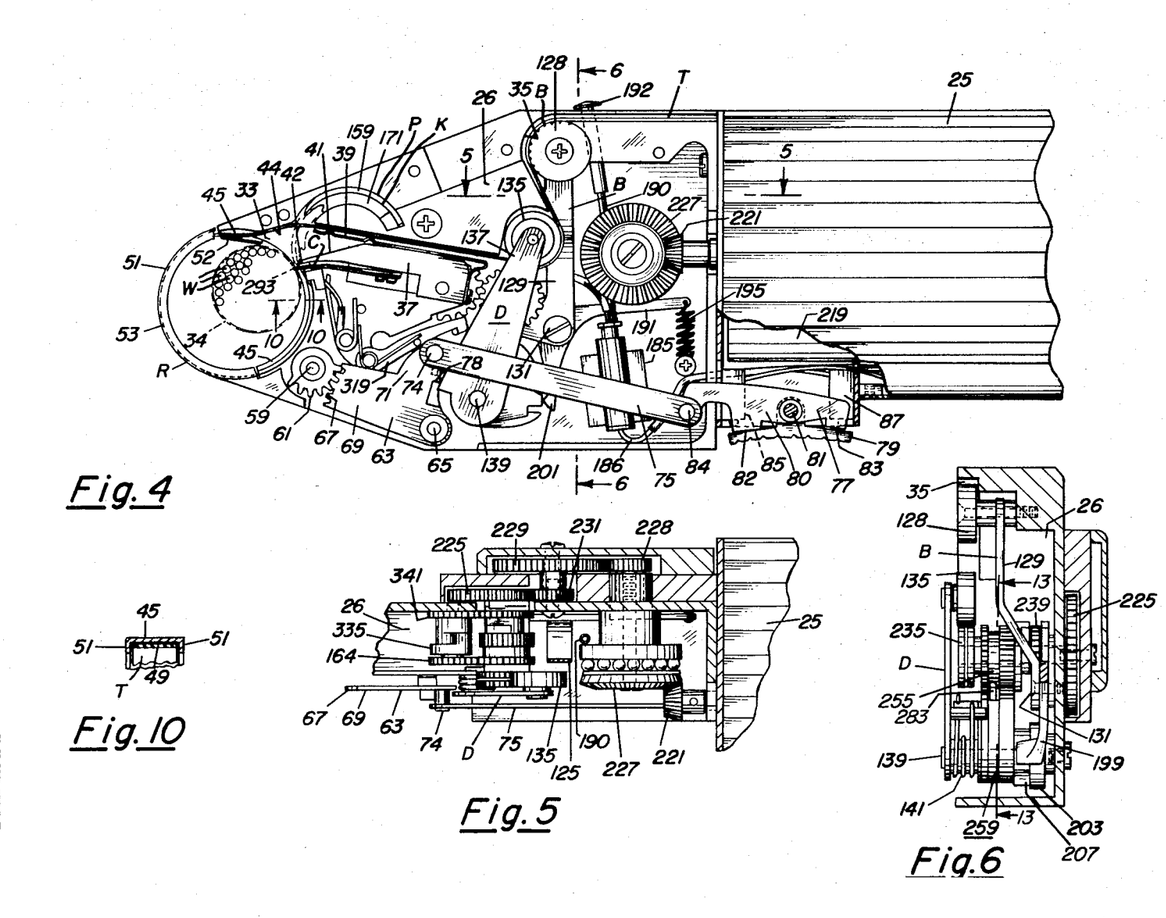
FIG. 4 is a fragmentary, partially in section, side view, in enlarged scale, of the device shown in FIG. 1.
FIG. 5 is a fragmentary sectional view of the device shown in FIG. 1, the view being taken along the line 5—5 of FIG. 4.
FIG. 6 is a sectional view of the device shown in FIG. 1, the view being taken along the line 6—6 of FIG. 4.
FIG. 10 is a sectional view, in enlarged scale, of the track included in the device shown in FIG. 1, the view being taken along the line 10—10 of FIG. 4.
Figures 7, 8, 9:
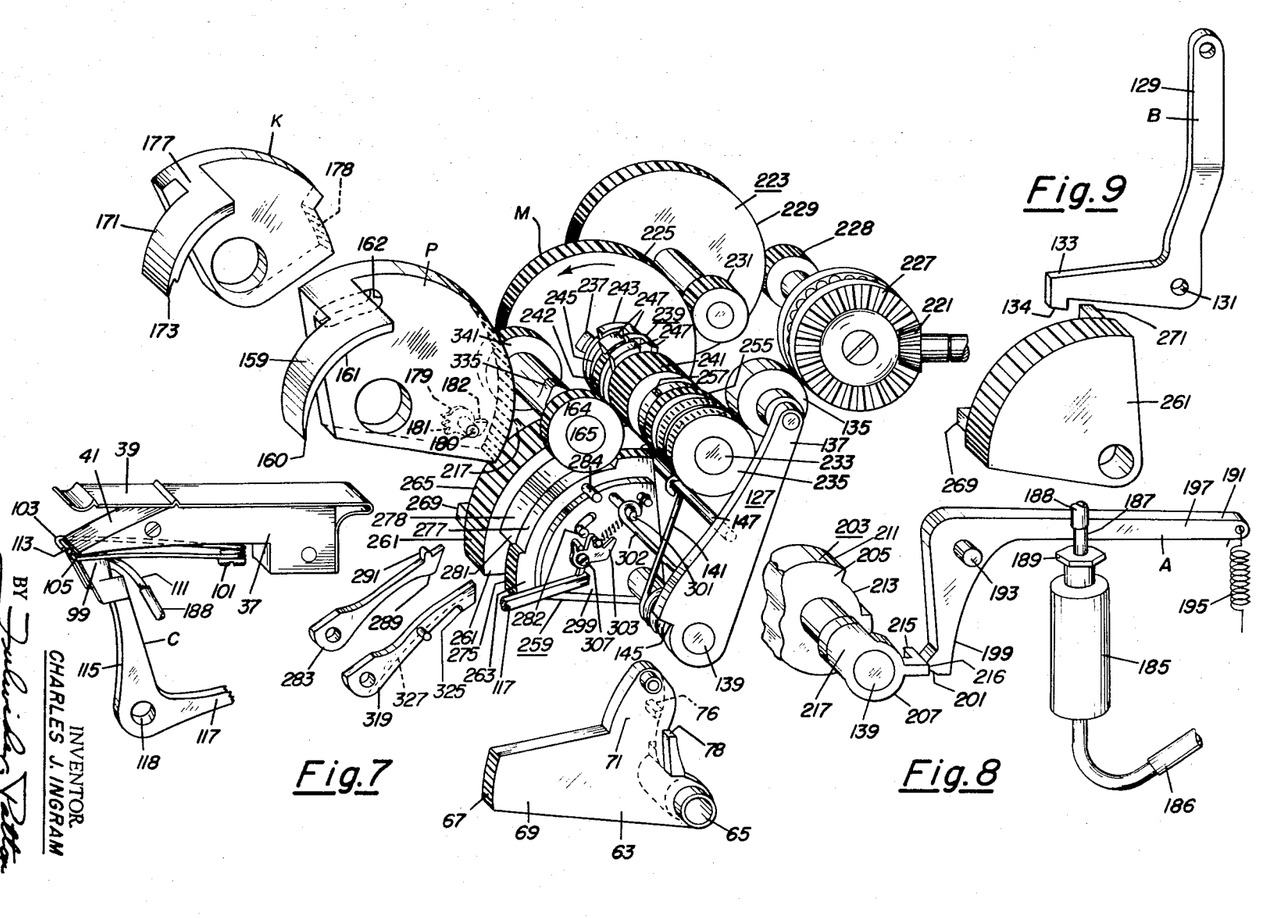
FIG. 7 is an exploded view, in enlarged scale, of some of the mechanism shown in FIG. 4.
FIG. 8 is an exploded view, in enlarged scale, of the bonding agent applicator included in the device shown in FIG. 1.
FIG. 9 is an exploded view, in enlarged scale, of the tape brake included in the device shown in FIG. 1.

Referring to FIGS. 4 and 7, the method of tying and tying device of present invention relate to tying a group of wires W in a bundle by extending a relatively stiff flexible tape T, such as acetate, therearound, tightening such tape, bonding the overlapping ends together and cutting the tape. The device E shown in FIG. 1 includes a combination drive and tightener D which feeds the tape T forwardly and around the inner periphery of a tape track R to encompass the bundle of wires W. The leading end of the tape T is then clamped by a clamp C, the tape leading back into the housing from the track R frictionally held by a brake B, the combination drive and tightener D actuated to pull the excess tape T from the track T thereby tightening the tape T around the wires W. A bonding applicator A is then actuated to spray a bonding agent on the outer periphery of the leading end of the tape T and the overlapping tape is pressed thereagainst by a tape positioner P. A cutter K is then actuated to sever the tape and free the device for removal. Operation of the above items is effected by a control mechanism M.

DESCRIPTION OF THE HOUSING AND TAPE TRACK T

Figures 1, 2, 3:
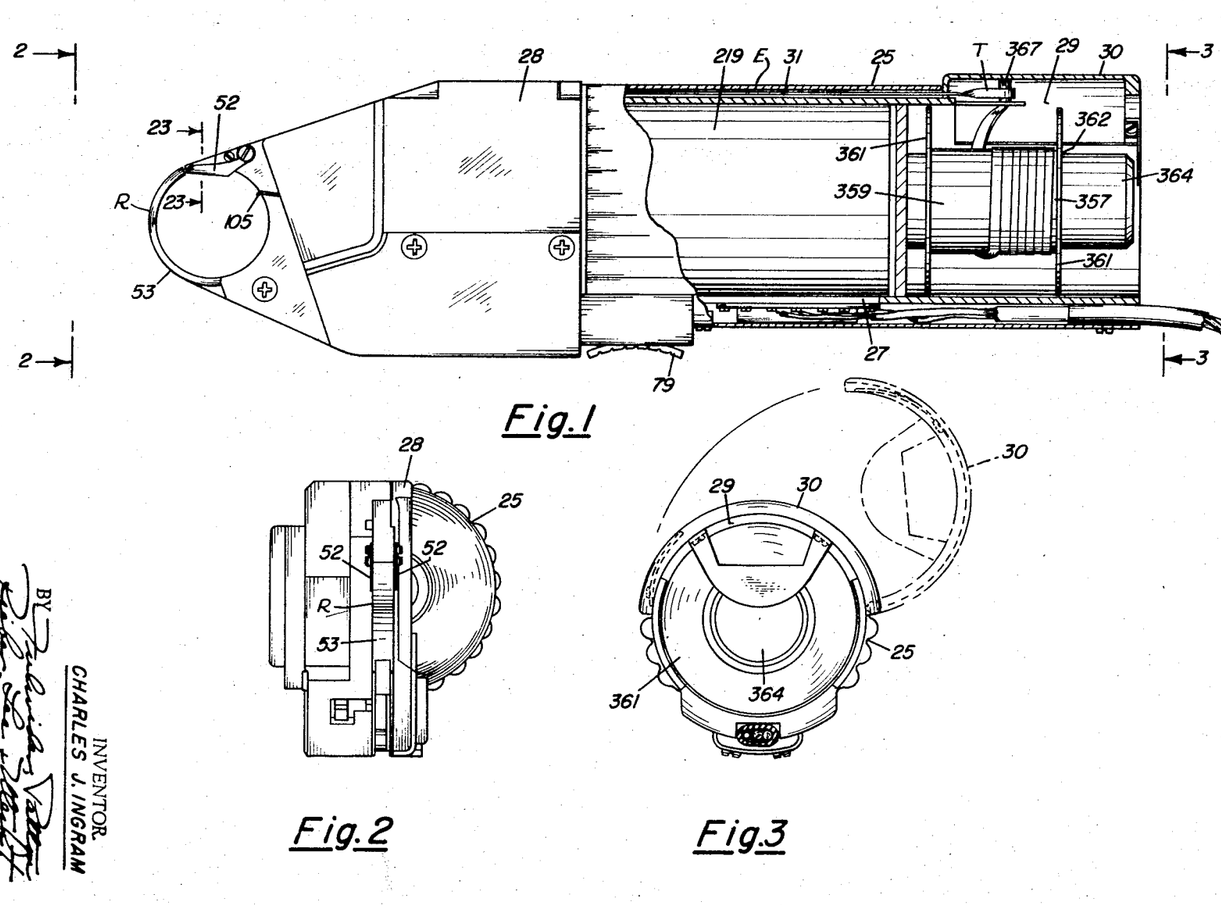
FIG. 1 is a side view, partially in section, of a tying device embodying the present invention.
FIG. 2 is a left end view of the device as shown in FIG. 1, the view being taken along the line 2—2 of FIG. 1.
FIG. 3 is a right end view of the device as shown in FIG. 1, the view being taken along the line 3—3 of FIG. 1.

Still referring to FIGS. 1 and 4, the tying device of this invention preferably includes a cylindrically shaped housing 25 of convenient hand hold size. The housing 25 is formed with a mechanism cavity 26, motor cavity 27 and spool cavity 29, and includes hinged doors 28 and 30 that may be opened to render the cavities 26 and 29, respectively, accessible. For purposes of this description, the end of the housing including the spool cavity 29 will be referred to as the forward end. Also, the side of the housing nearest the viewer, as viewed in FIG. 1, will be referred to as the near side or the left hand side and the side furthest from the viewer will be referred to as the far side. In addition, the rotational movement of the various components will be referred to as clockwise and counterclockwise as viewed in FIG. 2.

The housing 25 is formed on its top side with a longitudinally extending tape channel 31 that extends from the spool cavity 29 forwardly in the housing and terminates at a forwardly facing opening 33 for receipt of tape T.

Figure 11:
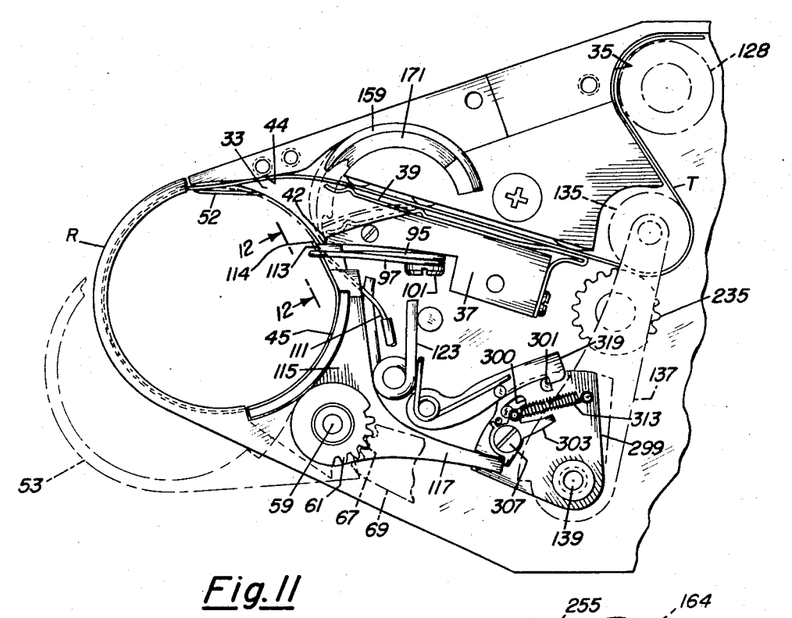
FIG. 11 is a fragmentary side view, in enlarged scale and partially in section, of the device shown in FIG. 1.
Figure 12:
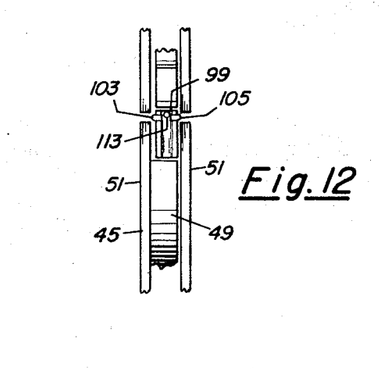
FIG. 12 is a sectional view, in enlarged scale, taken along the line 12—12 of FIG. 11.

Referring to FIG. 11, the channel 31 is formed with an intermediate reverse bend 35 which directs the tape T downwardly into the cavity 26. The tape T then turns and projects forwardly over a tape support 37 which is formed with a forwardly and downwardly angling incline 41 and cantileverally mounts a leaf spring 39 which projects forwardly over such incline and supports the tape T. The front face of the support 37 defines a shearing edge 42 over which the tape T is sheared. As the tape T is fed forwardly over the spring 39, it will strike a downwardly and forwardly inclined surface 44 formed by the housing 25 and will be guided out the tape opening 33.

Figure 23:
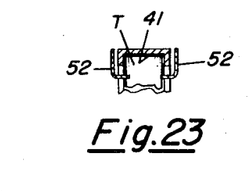
FIG. 23 is a sectional view, in enlarged scale, of the tape track included in the device shown in FIG. 1, the view being taken along the line 23—23 of FIG. 1.
Figure 24:
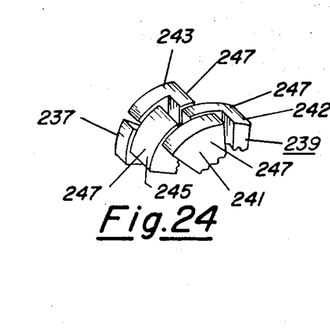
FIG. 24 is an exploded view, in enlarged scale, of the engaging ears included in the timing mechanism of the device shown in FIG. 1.

As best seen in FIG. 11, the tape track R includes a forwardly facing arcuate portion 45 formed by the forward end of the housing 25 and said tape track portion includes a circular tape guide surface 49 having raised lips 51 disposed on either side thereof. As best seen in FIGS. 1 and 23, confronting resilient tape guides 52 are mounted on either side of the upper part of the track portion 45 to provide support for the tape as it is extended from the opening 33, such guides being sufficiently flexible to enable the tape to be drawn downwardly therebetween during the tightening procedure.

Still referring to FIG. 11, a pivotal tape track gate 53 cooperates with the track portion 45 to form the circular tape track R. The gate 53 is journaled at 59 (FIG. 4) and is formed on its rear extremity with a gear portion 61. A bell crank shaped gate actuator 63 is journaled at 65 and has a gear portion formed by the front extremity of its horizontal arm 69 for meshing with the gear portion 61. The upwardly projecting arm 71 of the actuator 63 mounts a horizontal pin 74 which carries the front extremity of a push-pull link 75, said link having its rear extremity carried by a pin 81 included in an on-off switch 77 cooperating therewith to form a toggle type latch for operating the gate 53. Thus, the track 58 will be opened when the switch 77 is turned off to accept the objects, such as the plurality of electrical wires W, to be bundled and will be closed when the switch 77 is turned on to form, in combination with the track portion 45, the circular tape track R.

Referring to FIG. 7, the gate actuator 63 includes a clamp actuating pin 76 extending from the far side and an upwardly facing drive stop 78 on its near side, the purpose of which will appear hereinbelow.

As best seen in FIG. 4, the on-off switch 77 comprises a rocker plate 79 that is to be utilized as a push button, and an actuator lock 80. Both the plate 79 and the lock 80 are pivotally mounted on a pin 81 and the plate 79 extends over the lock 80, and engages downwardly facing drive stops 82 and 83 formed on the front and rear, respectively, thereof.

Thus, when the forward end of the rocker plate 79 is depressed, the lock 80 will be rotated in a clockwise direction to push the link 75 forwardly and cause the actuator to rotate counterclockwise and the gate 53 to rotate clockwise thereby closing it to form the encompassing circular tape track R. The actuator link 75, and lock 80 arrangement is such that the pins 74, 81 and 84 are aligned on center just prior to the time the gate 53 is closed. There is enough play in the linkages to permit the lock 80 to be urged far enough in the clockwise direction to align the pins 74, 81 and 84 and further rotation of the lock 80 moves the pin 84 clockwise out of such alignment. This over-the-center type action locks the gate 53 in its closed position until the lock 80 is rotated counterclockwise by the switch 77 being switched to reverse the mechanism.

With continued reference to FIG. 4, forward and reverse microswitches 85 and 87, respectively, are mounted under the forward and rearward ends, respectively, of the rocker plate 79. There is sufficient space between the stops 82 and 83 and the rocker plate 79 to enable the over-the-center action of the link 75 to take place during closing of the gate 53 without actuation of the switch 85 but continued counterclockwise rotation of the plate 79 will close such switch and initiate the forward cycle.

When the forward cycle of the device is complete and it is desirable to commence the reverse cycle, the rearward end of the rocker plate 79 is depressed to rotate the plate and lock 80 counterclockwise, thereby opening the gate 53. Further rotation of the phase 79 counterclockwise will actuate the switch 87 thereby initiating the reverse cycle of the device.

DESCRIPTION OF TAPE CLAMP C

Figure 15:
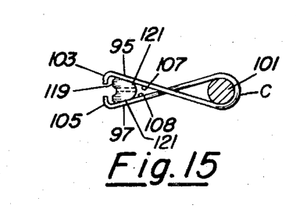
FIG. 15 is a top view of the clamp shown in FIG. 14, the view being taken along the line 15—15 of FIG. 14.

Referring to FIG. 1, the tape clamp C is adapted to clamp the leading extremity 114 of the tape that is extended upwardly in front of the lower portion of the opening 33 and the clamp comprises a pair of resilient crossed jaws 95 and 97 (FIG. 15) and a plunger 99. The jaws 95 and 97 are preferably made of commercial piano wire and are mounted at their rear extremity from a mounting screw 101. One of the jaws extends on either side of the path followed by the tape as it is extended around the track 58 and in front of the opening 33. The jaws 95 and 97 have their front extremities bent inwardly to form respective tines 103 and 105 that extend inwardly from the respective sides of the extended tape path. As best seen in FIG. 15, the forwardly and outwardly angling portions 107 and 108 of the respective tines 95 and 97 are engaged with opposite sides of the plunger 99 whereby rearward movement of such plunger 99 to the position shown in FIGS. 16 and 17 will spread the tines to enable the tape T to pass therebetween. A tube 111 for applying a bonding agent extends through the plunger 99 and terminates at a forwardly facing opening 113 confronts the outer surface of the leading extremity 114 of the tape T projecting upwardly beyond the tines 103 and 105 when the clamp C is closed.

Figure 14:
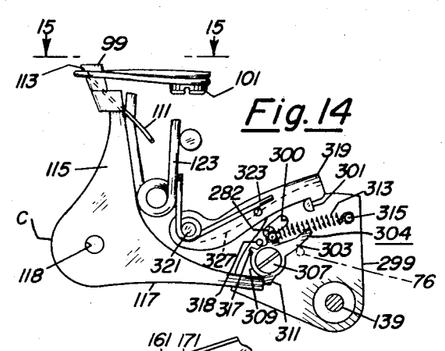
FIG. 14 is a side view, in enlarged scale, of the clamp and associated control mechanism included in the device shown in FIG. 1, the clamp being depicted in the tape receiving position.
Figure 16:
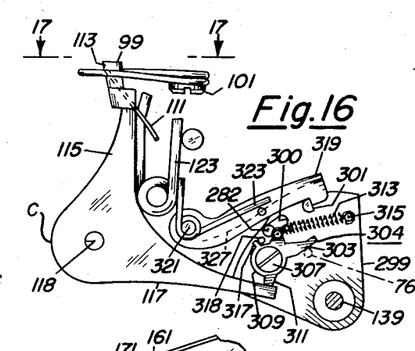
FIG. 16 is a side view, in enlarged scale, of the clamp and associated control mechanism included in the device shown in FIG. 1, the clamp being shown in the open position.

Referring to FIGS. 7 and 14, the plunger 99 is formed by the upper extremity of a vertical arm of a bell crank 115 and the horizontal arm thereof 117 is adapted to be controlled by the control mechanism, such bell crank being mounted on a pivot pin 18. The plunger 99 includes a forwardly facing clamping surface 119 for clamping the tape T against the tines 103 and 105 and a rearwardly facing actuating surface 121 for acting against the angled portions 107 and 108 of the resilient jaws 95 and 97. The bell crank 115 is biased in a counterclockwise direction by the torsional spring 123 (FIG. 14). In the embodiment shown, it is desirable that this plunger 99 be controlled in three positions; the clamping position (FIG. 18), the tape accepting position (FIG. 14) and also in an open position (FIG. 16). The three position control mechanism will be described later in this specification.

DESCRIPTION OF THE BRAKE B AND COMBINATION DRIVE AND TIGHTENER D

Referring to FIG. 4, the brake B and combination drive and tightener D act in combination with the clamp C to tighten the binding tape around the objects to be bundled. The brake B comprises a cam 128 that is carried rigidly on the upper extremity of a vertical arm of a bell crank 129 (FIG. 9) that is pivotally mounted at 131. The cam 128 is adapted to urge the tape frictionally against the reverse bend 35 included in the tape channel 31 and the bell crank 129 is biased in a clockwise direction to effect this urging. The forwardly extending arm 133 of the bell crank 129 includes a downwardly projecting tit 134 that is adapted to be acted on by a control mechanism to control the position of the cam 128.

In the embodiment shown, the tightener D serves as both a tightener and a drive idler and the designation tightener and drive idler will be referred to in this specification interchangeably. Referring to FIG. 7, the tightener D comprises an idler pulley 135 that is suitably carried by an arm 137 that is carried pivotally on a main shaft 139 and is biased in a counterclockwise direction by a torsional spring 141. The arm 137 includes a forwardly projecting downwardly facing stop 145 that is adapted to abut the upwardly facing stop 78 included in the gate actuator 63. The abutting surfaces 78 and 145 are arranged so that the surface 78 is moved into the path of surface 145 when the switch 77 is rotated in a counterclockwise direction by pushing on the rearward end of the rocker plate 79 to actuate the reverse switch 87. This feature prevents the tightener D from over rotating in a counterclockwise direction during the reverse cycle, which reverse cycle will be more clearly described below, and causing the pulley 135 to act as a drive idler thereby feeding tape through the device at a time when it is undesirable. The arm 137 includes an inwardly projecting drive pin 147 which is adapted to be acted upon by the control mechanism M to be described in detail later in this specification.

DESCRIPTION OF THE CUTTER K AND TAPE POSITIONER P

Referring to FIGS. 7, 20, 21 and 22, the cutter K and tape positioner P are journaled on a shaft 153. The positioner P includes an arcuate forwardly and downwardly extending positioning finger 159 that is disposed laterally of the body of the positioner and terminates in a forwardly facing tape contact surface 160.

The positioner P includes an elongated, arcuately shaped notch 162, the ends of which serve to drive the cutter K throughout a portion of its travel. The positioner P also includes a gear portion 163 on its rear extremity that is adapted to mesh with teeth included in an idler gear 164 (FIGS. 5 and 7), which gear is mounted freely rotatable on a shaft 165 and is driven from the control mechanism M to be described in detail later in this specification.

The cutter K is of somewhat similar construction and includes a forwardly and downwardly projecting arcuate blade 171 which is complementally shaped to overlie the positioning finger 159 and terminates in an angle cutting edge 173. The cutting edge 173 is adapted to shearingly cooperate with the shearing edge 42 (FIG. 11) upon rotation of the cutter K, thereby progressively hearing the included tape T. The blade 171 is carried transversely of the cutter body by the transversely extending portion 177, which portion is adapted to extend through the notch 162. A gear portion 178 is formed on the rear portion of the cutter K and is adapted to be acted upon to drive the cutter during the shearing action.

As best seen in FIG. 7, a cutter actuating cam 179 is journaled on a pin 180 extending from the positioner P. The cam 179 includes gear teeth 181 that are adapted to mesh with the teeth 178 in the cutter K. The cam 179 includes a rearwardly projecting arm defining a counterclockwise facing working surface 182 that is adapted to be acted upon to cause the cutter K to be driven in a clockwise direction with respect to the position P.

DESCRIPTION OF THE BONDING AGENT APPLICATOR A

Referring to FIG. 8, the bonding agent applicator apparatus A, obviously, could be any type of fastening means and in the embodiment shown, includes a plunger actuated valve 185 of the normaly closed type. The inlet of the valve 185 is adapted to be connected to a conduit 186 which is in communication with a container of pressurized bonding agent, such as acetone. The valve 185 includes a stem 187, projecting upwardly from the valve plunger, which stem is hollow and serves as a conduit for the exiting bonding agent. A flexible conduit 188 is attached to the stem 187 and extends to the tube 111 included in the plunger 99. An actuating plate 189 is carried on the valve stem 187.

A manual actuating shaft 190 extends freely through the housing 25 and terminates directly above the plate 189. The shaft 190 is biased upwardly and includes a push button 192 on its upper end. Thus, the valve 185 may be actuated manually to purge air from the conduit 188.

A bell crank shaped valve actator 191 is carried freely rotatable on a shaft 193 and is biased in a clockwise direction by a tension spring 195. The horizontal arm 197 of the actuator 191 extends over the plate 189 and is adapted to act thereupon to actuate the valve and the vertical arm 199 includes a forwardly projecting tit 201 for engagement by the control mechanism M.

Since the depicted embodiment of this tying device is reversible and since it is not desirable to actuate the valve 185 during the reverse cycle, a dual cam control arrangement 203 is provided to act on the tit 201 for controlling the clockwise rotation of the valve actuator 191 and resultant actuation of the bonding apparatus A. The dual cam arrangement 203 includes an idler cam 205 and an actuating cam 207, both of which cams are supported freely rotatable on the shaft 139. The periphery of the idler cam 205 forms a circularly shaped working surface 211 having an elongated peripheral notch 213 formed therein.

The actuator cam 207 includes a finger 215 that projects transversely of the body and into the notch 213. The finger 215 is narrower than the peripheral direction of the notch 213 and the notch 213 is of sufficient length to permit both both the finger 215 and tit 201 to extend thereinto conrently. The finger 215 includes a peripheral working surface 216 disposed on the same radius as the surface 211 for acting on the tit 201. An actuator arm 217 extends radially from the actuating cam 207 and is adapted to be acted thereupon to reciprocate such cam. At the beginning of a cycle, the cam arrangement 203 is positioned such that the surface 216 is under the tit 201 as shown in FIG. 8 thereby resisting rotation of the actuator 191. When it is desirable to actuate the bonding apparatus A the actuator cam 207 is rotated in a clockwise direction thus moving the finger 215 from under the tit 201 and permitting the actuator 191 to rotate in a clockwise direction, thereby actuating the bonding apparatus A. Continued rotation of the actuator cam 207 causes the finger 215 to engage the radial surface at the clockwise end of the notch 213 thus imparting rotation to the idler cam 205. Further rotation causes the peripheral surface 211 of the idler cam 205 to pick up the tit 201 thereby rotating the actuator 191 in a counterclockwise direction and disengaging it from the actuator plate 189 to enable the valve 185 to close.

The actuator 191 will be maintained in the closed position throughout the remainder of the forward cycle and on the reverse cycle the actuator cam 207 will be rotated in a counterclockwise direction and the finger 215 will be maintained against the radial surface at the counterclockwise end of the notch 213 and will pick up the tit 201 immediately upon its disengagement from the surface 211. This event happens at the end of the cycle and thus, the tit 201 is maintained on the finger 215 until a new cycle is commenced.

DESCRIPTION OF THE CONTROL MECHANISM M

Referring to FIGS. 1 and 7, the power source for the control mechanism M is preferably a reversible drive, alternating current motor 219. A powered beveled pinion 221 is carried on the motor shaft and drives a gear chain, generally designated 223, including gears 227, 228, 229 and 231 for driving a driven gear 225.

The driven gear 225 is carried rigidly on one end of a rotatable shaft 233 and a tape drive pulley 235 is carried rigidly on the opposite end of the shaft. An ear 237 extends from the near side of the drive wheel 225 and is adapted to actuate a conventional step type tape drive timing mechanism, generally designated 239.

The timing mechanism 239 is provided for delaying actuation of a main drive gear 241 which is supported freely rotatable on the main shaft 233. This feature is accomplished by providing an idler gear 242 and two idler cams 243 and 245, which gear and cams are also freely rotatable on the shaft 233. The gear 242 and cams 243 and 245 each include cooperating ears 247 and a like ear 247 extends from the tape tightening drive gear 241. Referring to FIG. 7, it will be clear that the clockwise radial surface of the ear 237 is adapted to engage the counterclockwise most surface of the ear 247 included in the cam 243 and that the clockwise surface of that ear 247 is adapted to engage the counterclockwise radial surface of the ear 247 included in the cam 245 and, further, that the clockwise radial surface of that latter ear is adapted to engage the counterclockwise most radial surface of the ear 247 included in the gear 242. In turn, the clockwise radial surface of the ear 247 included in the gear 242 is adapted to engage the counterclockwise radial surface of the cam 247 included in the main drive gear 241. This sequential stepping takes place during the reverse cycle of the device during which time the gear 225 is being driven in a counterclockwise direction. During the forward cycle the gear 225 is being driven in a clockwise direction and substantially a reverse sequential stepping takes place.

From the above, it will be apparent that at the beginning of the forward cycle of the tying device, realizing that the drive gear 225 is driven in a clockwise direction during the reverse cycle, the engaging ears 247 will be engaged sequentially from the ear 237 and will be driven counterclockwise. Upon commencing the forward cycle, the ear 237 will necessarily be moved in a counterclockwise direction and will pass through a nearly complete revolution and will engage the clockwise radial surface of the ear 247 included in the cam 243 and that that ear will likewise be rotated through a nearly complete revolution before it will engage the clockwise radial surface of the ear 247 included in cam 245 and that that latter ear will be rotated through a nearly complete cycle before it engages the ear 247 included in the gear 242. Upon the latter engagement, the gear 242 will be rotated and the included ear 247 will be moved into position against the clockwise radial surface of the ear 247 included in the drive gear 241 and the gear will commence rotating. Since the pulley 235 is rigidly affixed to the shaft 233, it rotates during the entire aforedescribed ear engaging events and since the incoming tape is being fed over this pulley 235, the length of tape which is fed over that pulley is determined by the diameter of that pulley and the distance between the obverse engaging surfaces of the ears 247.

With continued reference of FIG. 7, a tape positioner idler gear 255 is also carried freely rotatable on the main shaft 233 and includes an axially projecting hub formed with an index slot 257. The positioner drive gear 255 meshes with the idler gear 164 and is adapted to impart rotation thereto and consequently, to the positioner P and cutter K.

The above described timing mechanism 239 acts through the control mechanism M to operate the elements of the tying device. The control mechanism M includes a pie shaped main drive 261 and a similarly shaped positioner drive 263, both of such drives, 261 and 263 are carried rigidly on the shaft 139, and the main drive 261 has its arcuate extremity formed with a gear portion 265 for meshing with the drive gear 241.

Referring to FIG. 7, the bonding apparatus actuating cam 207 is carried freely rotatable on the shaft 139 and said cam is disposed adjacent the far side of the main drive 261 with the actuator arm 217 extending radially therealong. As best seen in FIG. 9, drive pins 269 and 271 extend from the far side of the main drive 261 and are adapted to act on the obverse radial surfaces of the applicator actuator arm 217 upon rotation of the drive in forward and reverse directions. The pin 271 is also adapted to act on the brake tit 134 to maintain the brake rotated counterclockwise and out of engagement when the main drive 261 is in its counterclockwisemost position.

As best seen in FIG. 7, the positioner drive 263 includes two spaced apart gear segments 273 and 275 which are adapted to sequentially mesh with the positioner drive gear 255 and are separated by a void 277. A ring 278 extends from the far side, as viewed in FIG. 7, of the positioner drive 263 and forms a circularly shaped upwardly facing cam surface 281. A hold plate control pin 282 and a hold arm release pin 284 extend from the near side of the intermediate drive, the purpose of which will be set forth hereinbelow.

Figure 13:
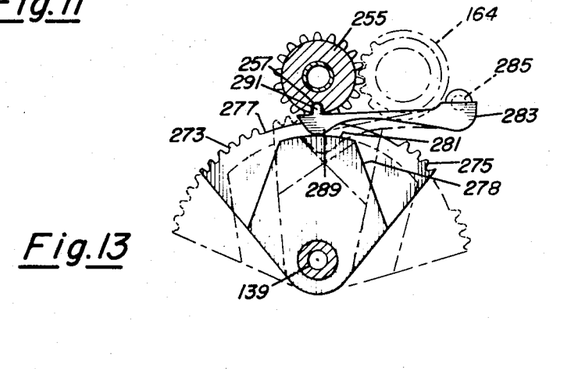
FIG. 13 is a vertical sectional view, in enlarged scale, taken along the line 13—13 of FIG. 6.

Referring to FIG. 13, a position retainer 283 is pivotally carried on one end from a shaft 285 and is formed on its free extremity with a downwardly projecting cam surface 289 that is adapted to ride on the cam surface 281. The positioner 283 also includes an upwardly extending index 291 on its free end which is adapted to be lifted into the index slot 257 of the cutter drive gear 255.

Thus, it will be apparent that when the timing mechanism 239 imparts rotation to the drive gear 241, the main drive 261 will be rotated in a clockwise direction, thus rotating the shaft 139 and imparting rotation to the positioner drive 263. The first gear segment 273 (FIG. 13) of the positioner drive 263 rotates the positioner drive gear 255 a selected amount and as such segment disengages the drive gear 255, the retainer 283 is lifted by the cam surface 281 to bring the index 291 into engagement with the index slot 257 as shown in FIG. 13. The retainer 283 will continue to ride on the surface 281 throughout the length of the gear teeth void 278, thus maintaining the positioner P in position with the finger 159 against the feed tape as shown in broken lines at 293 in FIG. 4 and pushing the tape radially inwardly in the track R. This positioning of the feed tape T radially inwardly in the track R tends to urge the leading end 114 of the tape, which extends upwardly beyond the clamp C, radially inwardly to prevent doubling back thereof as the feed tape is pulled back into the housing 25 during the tightening operation.

Continued rotation of the drive gear 241 and main drive 261 will cause the cam surface 281 to move clockwise as viewed in FIG. 4, from under the retainer 283, thus causing the index 291 to disengage from the index slot 257. Concurrent with the aforedescribed disengagement, the gear segment 275 engages the cutter drive gear 255 and causes the positioner P to be rotated further in a counterclockwise direction, thus causing the finger surface 160 to press the feed tape against the end of the tape extended beyond the clamp 93 as shown in broken lines, in FIG. 11. This function is accomplished after the encompassing tape has been tightened around the objects and after the bonding agent has been applied to the outwardly facing surface of the extended tape end.

Referring to FIG. 14, a pie shaped hold plate 299 is carried freely rotatable on the main shaft 139 and includes an elongated arcuate slot 300 which receives the limiting pin 282 projecting from the positioner drive 263 (FIG. 7). A hold pin 301 projects from the near side of the hold plate 299 for selective engagement to limit clockwise rotation of such plate under the influence of a torsional spring 302 (FIG. 7).

As best seen in FIGS. 7 and 14, a clamp positioner cam 304 is pivotally mounted on the hold plate 299 by a screw 307 and includes a rearwardly projecting arm 303. The cam includes a circularly shaped cam surface 309 having a tit 311 projecting downwardly therefrom. A limit finger 317 extends from the clamp positioner cam 304 and is adapted to engage a cooperating limiting pin 318 extending from the hold plate to limit clockwise rotation of the cam under the influence of a tension spring 313.

Still referring to FIG. 14, a hold arm 319 is pivotally mounted at its front end from the housing 25 by a pivot pin 321 and is biased in a clockwise direction by a torsional spring 323. The arm 319 is formed on its rear extremity with a downwardly projecting lip defining a forwardly facing surface 325 that is adapted to selectively engage the hold pin 301 projecting from the hold plate 299. The back side of the hold arm 319 is formed with a longitudinal notch to define a downwardly facing cam surface 327 that rides on the control pin 284 (FIG. 7) projecting from the side of the positioner drive.

Operation of the hold plate 299 can best be understood by considering its functioning from the beginning of a forward cycle of the device. On commencement of the forward cycle the hold plate 299 is being maintained in its most counterclockwise position by the hold arm 319 acting on the hold pin 301 as shown in FIG. 16. In this position, the tit 311 of the clamp positiner cam is in position over the arm 117 of the clamp bell crank 115, thus holding the plunger 99 back against the clamp actuating surfaces 109 and 111 to hold the clamp C open. Positioning of the switch 77 to drive the device in the forward direction rotates the actuator 63 clockwise to move the clamp actuating pin 76 (FIG. 7) upwardly under cam 303 as shown in FIG. 14, thus rotating such cam clockwise and moving the tit 311 rearwardly from engagement with the arm 117 and permitting said arm to rotate into contact with the circular cam surface 309. This permits the plunger 99 to move forwardly to enable the jaws 95 and 97 to close.

After sufficient tape has been fed over the gear 235 to project the leading end around the track R and into the clamp C and rotation of the rigidly mounted positioner drive 263 has commenced, the lifting pin 284 (FIG. 7) will act on the cam surface 327 (FIG. 14) to lift the hold arm 319 from engagement with the hold pin 301 of the hold plate 299 to free such plate for rotation. After disengagement of the hold arm 319, the hold plate 299 is moved clockwise by the spring 302 to the extent dictated by the drive pin 284. Continued clockwise rotation of the hold plate 299 with the positioner drive 263 moves the cam surface 309 rearwardly from engagement with the arm 117 and permits the bell crank 115 to rotate further in the counterclockwise direction, thus moving the plunger 99 into engagement with the tape between the jaw tines 103 and 105. This action clamps the extended end of the tape securely between the plunger 99 and tines 103 and 105.

Figure 17:
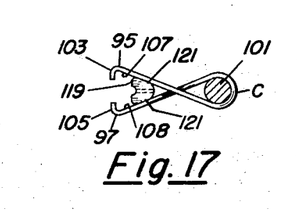
FIG. 17 is a top view of the clamp shown in FIG. 18, the view being taken along the line 17—17 of FIG. 16.

During the reverse cycle, the gate actuator 63 is pivoted clockwise to position the clamp actuating pin 76 (FIG. 7) clear of the path of the cam 304 and that when the hold plate 299 is rotated counterclockwise, the cam tit 311 will be moved into contact with the arm 117, thereby forcing the plunger 99 into operating engagement with the angled jaw actuating portions 107 and 108. Thus, the jaws 95 and 97 will be spread to permit the tape to pass between the confronting tines 103 and 105 as shown in FIG. 17. It is noted that at this time the tape has been bound securely around the objects being bound.

Referring now to operation of the cutter K through the cam 179, a cooperating drive cam 335 (FIG. 7) is carried on the freely rotatable shaft 165. A gear 341 is carried rigidly on the shaft 165 and is adapted to mesh with the timing gear 242. The shaft 165 is positioned such that after full counterclockwise rotation of the positioner P by the positioner drive 263, the arm 182 of the cam 179 will be positioned in the path of the cam 335 whereby counterclockwise rotation of the shaft 165 will bring the cam 355 into engagement with the arm 182 and pivot the cam 179 clockwise to drive the cutter K counterclockwise. Such counterclockwise rotation of the cutter K will cause the shearing edge 173 (FIG. 11) to be moved shearingly past the shearing edge 42 included in the support 37, thereby shearing the included tape.

Figure 20:
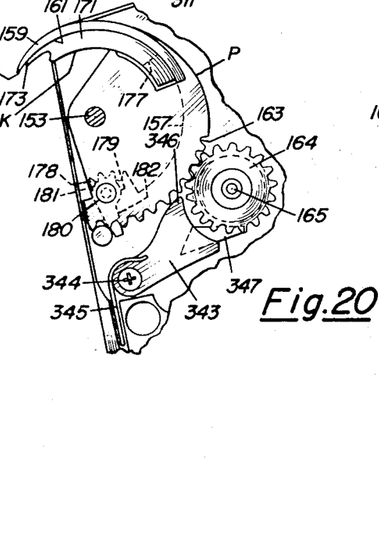
FIGS. 20–22 are side views, in enlarged scale, of the cutter and positioner and associated drive mechanism included in the device shown in FIG. 1, the cutter and positioner being shown in three different positions.

Referring to FIG. 20, a lock 343 is provided for locking the finger 159 of the positioner P pressed against the tape during actuation of the cutter K. The lock 343 in suitably journaled at 344 and is biased counterclockwise against the peripheral surface of the positioner P by a spring 345. The lock 343 includes a working surface 346 (FIG. 22), that is adapted to selectively abut the clockwise most radial surface of the positioner P, and a cam follower 347. When the positioner P has been driven its full distance counterclockwise to the position shown in FIG. 22, the arcuate surface of such positioner will be moved clear of the working surface 346 to enable the lock 343 to rotate counterclockwise to the position shown to move the working surface into the path of the clockwise most radial surface of such positioner to block clockwise rotation thereof and lock the finger 159 into pressing engagement with the overlapped tape T.

During the reverse cycle and after the cutter K has been actuated it is desirable to unlock the lock 343 and this is accomplished by positioning the cam follower 347 such that the cutter actuating cam 345 (FIG. 7) acts thereupon after it has acted on the cutter. The lock 343 is then rotated clockwise to move the surface 346 clear of the positioner path.

As best seen in FIG. 1, a tape spool 357 is carried in the compartment 29 and includes a shank 359 and end flanges 361. The spool 357 includes a longitudinal bore 362 for receipt of a shaft 364 projecting rearwardly from the forward wall of the compartment 29. A tape guide post 367 is mounted centrally in the upper portion of the compartment 29 and the tape T is passed thereover.

OPERATION OF THE DEVICE E

Referring to FIG. 1, it will be apparent that the device E is threaded with tape by opening the door 30 and inserting the spool 357 of tape. The tape T is then threaded around the post 367 and through the tape channel 31 over the brake cam 128 and under the drive pulley 135. The extending end of the tape is then threaded over the leaf spring 39, through opening 33 and around the track R. It is desirable to close the gate 53 and actuate the device once before actually beginning the binding operation, to assure that the proper length of tape is extended beyond the drive pulley 235.

The gate 53 may then be opened by pressing on the rearward end of the rocker plate 79 and the objects to be bound can be moved within the track R and the gate closed therearound by pushing on the forward end of the switch plate 79. This forward rocking of the switch 77 causes the clamp actuating pin 76 (FIGS. 16 and 17) included in the actuator 63 to move the arm of the cam 304 upwardly thereby rotating such cam counterclockwise and moving the tit 311 rearwardly from the path of the rearwardly projecting arm 117 to enable the plunger 99 to move forwardly to position in FIG. 15 whereby the tines 103 and 105 will be sufficiently close together to retain tape T therebehind and the plunger will be spaced rearwardly of such tines to form a tape path between such tines and plunger. The counterclockwise rotation of the gate actuator 63 also moves the stop 78 forwardly out of the path of the lip 145 on the drive arm 137 to free such arm to be pivoted forward by the spring 141 to press the tape T against the drive wheel 235 to feed tape thereover.

The over-the-center action of the toggle type switch 77 and link 75 arrangement locks the gate 53 into the closed position and the forward cycle of the device is initiated by pushing further downwardly on the forward end of the rocker plate 79, thus closing the microswitch 85.

OPERATION OF THE CLAMP C, BRAKE B AND TAPE DRIVE AND TIGHTENER D

During forward motion, the bevel gear 221 is driven in a counterclockwise direction thus causing the drive gear 225 to be rotated in a counterclockwise direction. Rotation of the gear 225 causes the shaft 233 and supported drive wheel 235 to be rotated, thereby pulling the tape from the spool 357, through the channel 31, and driving it around the tape track R. Rotation of the gear 225 also actuates the timing mechanism 239 and after a predetermined number of revolutions of the gear 225, the main drive gear 241 is engaged, thereby driving the main drive 261 clockwise and rotating the main shaft 139. The clockwise radial surface of the main drive 261 is then moved into engagement with the actuation pin 147 of the tape drive D thus disengaging the idler pulley 135 from the tape T and drive gear 235 to discontinue tape feed. The gear arrangement, track size, etc., is such that sufficient tape has been fed over the pulley 235 to drive the extending end of the tape around the track R and under the jaw tines 103 and 105 and approximately one quarter of an inch therebeyond.

Figure 18:
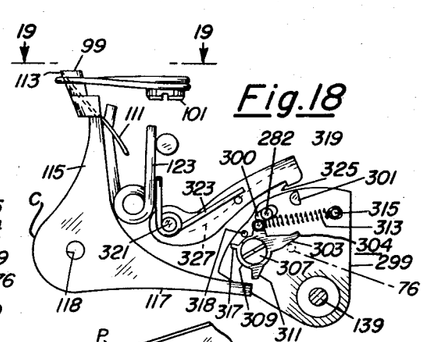
FIG. 18 is a side view, in enlarged scale, of the clamp and associated control mechanism included in the device shown in FIG. 1, the clamp being depicted in the clamping position.

Rotation of the shaft 139 also rotates the positioner drive 263 counterclockwise thereby causing the included pin 284 to act on the hold arm cam surface 327 to lift the hold arm 319 from the hold pin 301 on the hold plate 299 as shown in FIG. 18 to free such hold plate to be driven in a clockwise direction by the spring 302. Such rotation of the hold plate 299 moves the cam 304 from the path of the arm 117 and frees the plunger 99 to be biased into contact with the tape T included between said plunger and the clamp tines 103 and 105 thereby clamping the leading extremity of such tape.

Referring to FIGS. 4 and 9, counterclockwise rotation of the main drive 261 moves the pin 271 (FIG. 9) rearwardly to enable the tit 134 to enable the brake bell crank 125 to rotate clockwise and move the cam 128 into engagement with the tape T at 35 to hold such tape against accidental feed out.

OPERATION OF THE POSITIONER P

Rotation of the positioner drive 263 rotates the positioner idler gear 255 to rotate the positioner P into position with the finger 159 pressing against the feed tape as shown in broken lines at 293. The first gear segment 273 of the positioner drive 263 then disengages the positioner idler gear 255 and concurrently therewith the cam surface 281 (FIG. 13) raises the retainer 283 into position with the index 291 engaging the slot 257 to lock the gear 255 and maintain the positioner P engaged with the tape T to prevent doubling back of the leading extremity 114 as the tape is tightened.

As the positioner drive 263 continues to drive the tape drive and tightener D rearwardly, the wheel 135 is carried downwardly and rearwardly through a path that encounters the tape to pull the tape from the track R. When the tape begins to tighten around the objects being bundled the tape is pulled downwardly against the inwardly turned lips of the guides 52 (FIGS. 1 and 23) to spread such guides and release the tape thereby permitting continued tightening to pull the tape around the objects securely. The tightener D continues to operate throughout the forward cycle of the device and when the tape has been pulled securely around the bundle, additional feed tape is pulled across the brake B to permit the tightener D to be rotated into its extreme clockwise position bottoming out on the bottom wall of the housing 25.

OPERATION OF THE APPLICATOR A

Referring to FIG. 8, as the control main drive 261 continues to rotate, the bonding apparatus control pin 269 (FIG. 9) picks up the cam arm 217 and rotates the finger 215 from engagement with the tit 201. The valve 285 is then actuated and the pressurized bonding agent is forced through the conduit 187 and out of opening 113, and onto the outwardly facing surface of the tape 114 extended beyond the clamp C. Further rotation of the cam 207 rotates the cam 205 and the tit 201 is picked up on the cam surface 211, thereby deactuating the bonding apparatus 183.

OPERATION OF THE POSITIONER P TO PRESS THE OVERLAPPING TAPE TOGETHER

Referring to FIG. 13, toward the end of the forward cycle, the cam surface 281 is moved from beneath the retainer 283 and the index 291 is dropped from the index hole 257. Immediately after this disengagement, the second gear segment 275 included in the positioner drive 263 picks up the idler gear 255 and rotates the positioner P further clockwise thereby moving the finger surface 160 firmly against the feed tape to press such feed tape firmly against the outer surface of the leading extremity 114 (FIG. 11) of the tape T. When the positioner P has completed its full forward travel, the lock 343 (FIG. 22) will drop into position with the cam surface 346 disposed below the rear of such positioner to lock such with the finger 159 in position holding the overlapping portions of tape T pressed together while the bonding agent dries. This occurs at the end of the forward cycle of the device and such forward cycle is stopped by the tightener D bottoming out on the bottom wall of the housing.

OPERATION IN REVERSE

Referring to FIG. 4, the reverse cycle is initiated by pressing on the aft end of the switch rocker plate 79 and actuating the microswitch 87. Counterclockwise rotation of the rocker plate 79 rotates the lock 80 counterclockwise and pulls the link back to rotate the actuator 63 (FIG. 7) clockwise thereby opening the gate 53 moving the stop 78 rearwardly into the path of the lip 145 included in the drive D to limit forward rotation of such drive to prevent engagement with the tape T and drive wheel 235 during the reverse cycle. The pin 76 is also moved rearwardly from the path of the clamp positioner cam arm 303 as shown in FIG. 16. The gear 225 is driven in a clockwise direction and the timing mechanism 239 is operated through its reverse turns.

OPERATION OF THE CUTTER K

Referring to FIG. 7, after engagement of timing cams 243 and 245, the timing gear 242 is engaged to rotate the gear 341 and shaft 165 counterclockwise direction thereby moving the cam 335 into engagement with the arm 182 of the cam 179 and rotating the cutter K further in a counterclockwise direction, thus shearing the feed tape between the shearing edges 173 and 42. The cam 345 is then rotated into engagement with the cam follower 347 (FIGS. 20–22) and lock 343 is rotated from engagement with the positioner P.

The remainder of the reverse cycle is substantially the reverse of the above described forward cycle. Referring to FIG. 9, the pin 271 extending from the main drive 261 picks up the valve cam arm 217 and rotates the cam in a counterclockwise direction thereby causing the idler cam 205 to be rotated in that direction and the finger 215 is moved under the tit 201 as the tit disengages the idler cam surface 211 to thereby prevent opening of the valve 185. This occurs at the end of the reverse cycle and leaves the cam arrangement 203 ready for the forward cycle. Also, at the end of the reverse cycle, the hold plate 299 (FIG. 16) carries the cam 304 into position with the cam tit 311 contacting the arm 117 to rotate against the jaw actuation surfaces 107 and 108 thereby spreading the tines 103 and 105 sufficiently to permit the binding tape to pass between the confronting ends of said tines as the device is removed from the bundle of wires W.

DESCRIPTION OF THE SECOND EMBODIMENT E'

Figure 1A:
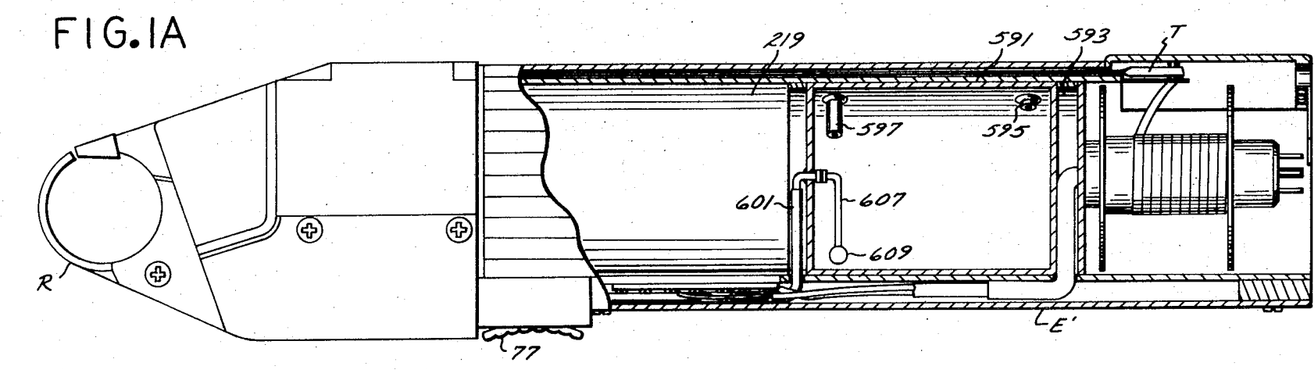
FIG. 1A is a side view, partially in section, of a second embodiment of the tying device of present invention.
Figures 7A, 8A:
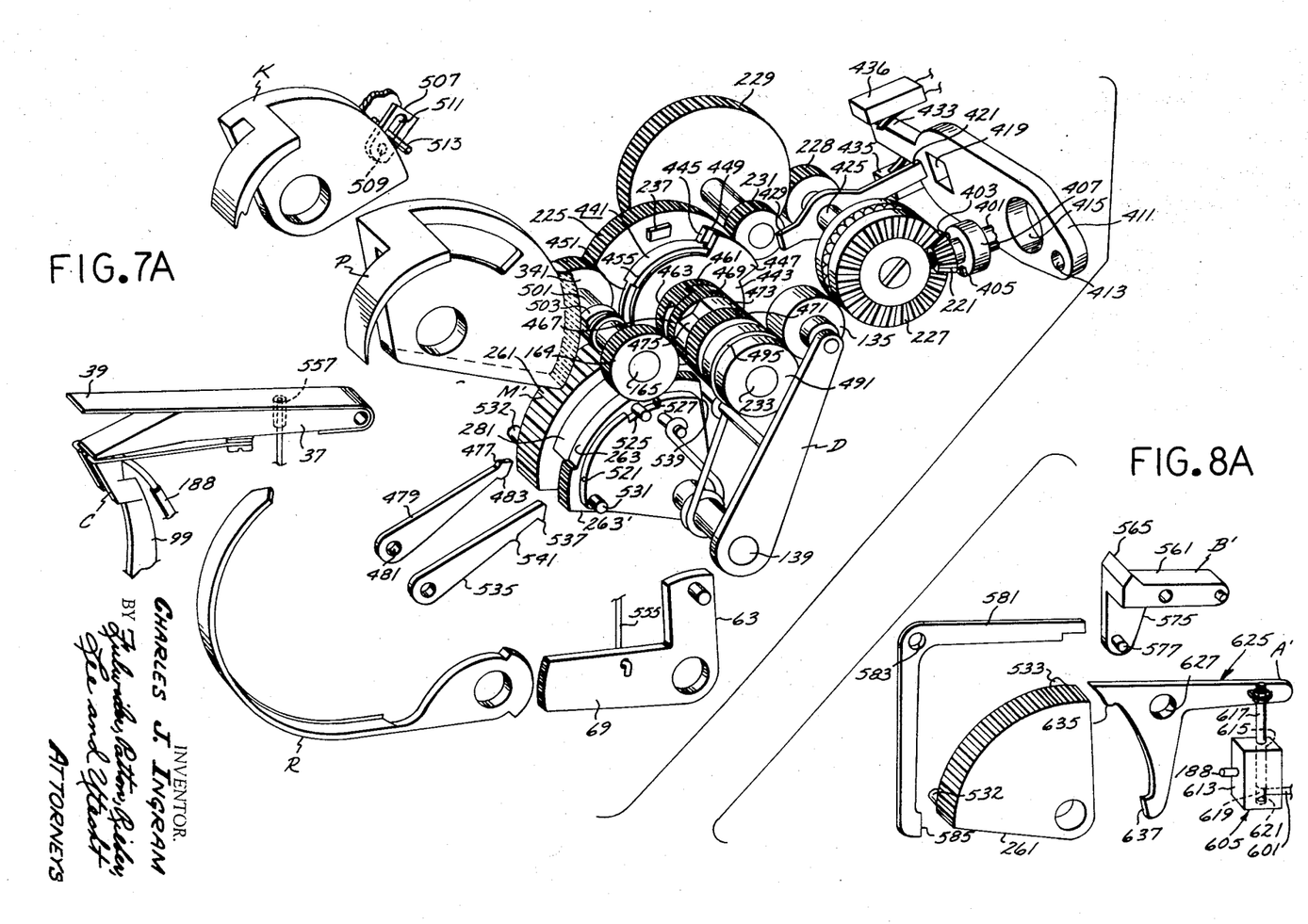
FIG. 7A is an exploded view, in enlarged scale, of some of the mechanism shown in FIG. 4A.
FIG. 8A is an exploded view, in enlarged scale, of the bonding agent applicator included in the device shown in FIG. 1A.

The tying device E' shown in FIG. 1A is similar to that shown in FIG. 1 and, referring to FIG. 7A, includes the gear chain comprising the gears 221, 227, 228, 229, 231 and 225. The bevel gear 221 is carried on the motor drive shaft 401 and includes a rearwardly projecting cog 403 which engages a forwardly projecting cog 405 formed on the front surface of a brake collar 407 carried freely rotatable on the shaft 401 to rotate said collar. A brake actuating plate 411 is pivotally mounted on one end at 413 and is formed with a through bore 415 which is loosely received over the brake collar 407. The free end of the plate 411 is formed with a through window 419 which receives the rearwardly projecting end of a brake actuating lever 421 is rotatably carried on a shaft 425 which connects the gears 227 and 228 together and includes a forwardly projecting arm 229 which is raised and lowered to effect rotation of the brake plate 411 and frictionally restrain rotation of the brake collar 407 to brake a control mechanism M'. The brake plate 411 is formed on its free end with an arm 433 which in alignment with the actuating arms of microswitchs 435 and 436 disposed below and above, respectively, of such arm and connected in series with the motor 219 whereby such motor will be stopped when the free end of the plate 411 is rotated downwardly at the end of the forward cycle or upwardly at the end of the reverse cycle.

A timing mechanism, generally designated 441, includes a pair of timing washers, generally designated 443 and 445, which are formed with radially outwardly projecting ears 447 and 449, respectively, and have an intermediate washer, generally designated 451, sandwiched therebetween. The timing washers 443, 445 and 451 are all freely rotatable on the shaft 233 and the sandwiched washer 451 includes a rim portion 455 which projects axially in opposite directions from the washer 451 and is engaged by the ears 447 and 449.

Still referring to FIG. 7, formed integrally with the intermediate washer 451 is a cutter drive gear 461 having an axially projecting tab 463 which is received in a circumferential notch 467 formed in a main drive gear 469 which is carried freely rotatable on the shaft 233.

A positioner drive gear 471 is mounted freely rotatable on the shaft 233 and includes an axially projecting hub 473 having a V-notch 475 therein for receipt of an index 477 projecting upwardly at the rear extremity of a retainer 479 carried pivotally at 481 and formed at its rear extremity with a downwardly projecting cam surface 483. A drive wheel 491 is mounted rigidly on the rear end of the shaft 233 and is formed with a central circumferential groove for receipt of a rubber O-ring 495.

With continued reference to FIG. 7, the cutter drive idler 341 is formed integrally with a sleeve 501 which is received freely rotatable over the shaft 165 and has a peripheral strip 503 thereon. The strip 503 is selectively engageable with the rear end of a dog 507 carried at its front extremity from a pivot pin 509 on the cutter K. The dog 507 includes a longitudinal notch 511 which receives a slider pin 513 mounted on the housing 25 whereby the dog will be pivoted downwardly into the path of the strip 503 when the positioner P and cutter K are rotated forwardly to move the positioner into position pressing the overlapping tape together.

A pie-shaped hold plate, generally designated 521, is rotatably mounted at its apex on the main shaft 139 and is biased clockwise by a torsional spring. A peg 525 projects from the near side of a positioner drive 263' and is received in an elongated peripheral notch 527 formed in the hold plate 521. A pin 531 projects from the near side of the hold plate 521 and engages the rear extremity of the bell crank arm 117 which actuates the plunger 99.

As best seen in FIG. 8A, a brake actuating pin 532 and a valve actuating pin 533 project from the far side of the main drive 261'.

A hold arm, generally designated 535, is pivotally mounted at its front extremity and has its rear extremity formed with a downwardly extending lip 537 which selectively hooks behind the hold plate 521 at 539. A downwardly projecting tit 541 is formed intermediately on the hold arm 535 and projects into the notch 527 of the hold plate 521 and is acted on by the peg 525 to lift the rear extremity of such arm and disengage the lip 537 from said hold plate.

Still referring to FIG. 7A, an upwardly projecting stiff wire or hold rod 555 is connected on its lower extremity to the forwardly projecting arm 69 of the gate actuator 63 and projects upwardly into a through bore 557 formed in the support 37 whereby the upper extremity of such rod 555 will be pressed upwardly against the spring 39 when the gate 53 is opened to thereby frictionally retain the tape T from being accidentally drawn back into the housing 25 while the gate is open.

Figure 4A:
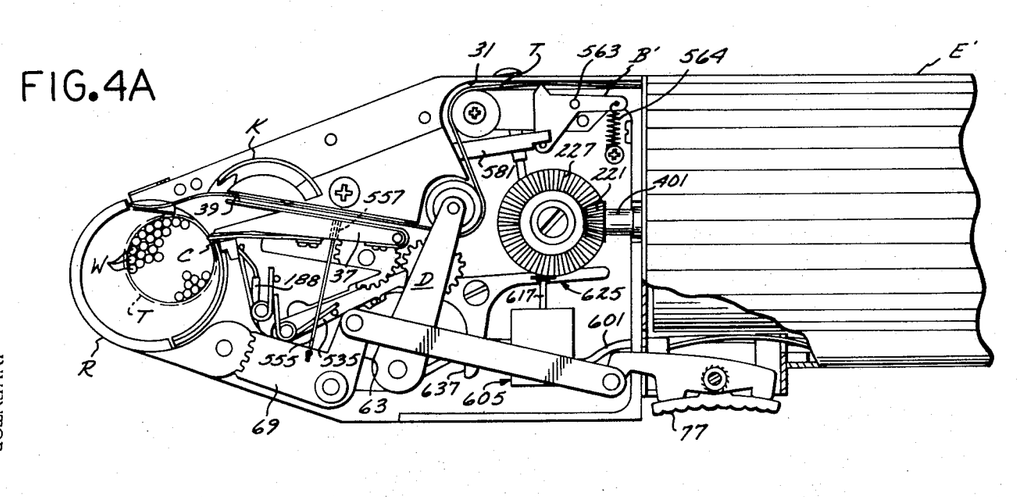
FIG. 4A is a fragmentary, partially in section, side view, in enlarged scale, of the tying device shown in FIG. 4A.

Referring to FIGS. 4A and 8A, a brake B' includes a dog, generally designated 561, pivotally mounted from the housing 25 by means of pivot pin 563 and biased counterclockwise by a tension spring 564 (FIG. 4A). The dog 561 includes an upwardly projecting transverse edge 565 which engages the tape T and presses it against the upper wall of the tape channel 31 to selectively hold such brake against accidental feed out. The dog 561 includes a downwardly projecting longitudinal flange 575 having an actuating pin 577 projecting from the lower extremity thereof and selectively engaged by the horizontal arm of a bell crank shaped brake actuator 581. The brake actuator 581 is pivotally mounted at 583 and has its downwardly projecting arm formed with a rearwardly turned portion 585 that is selectively engaged by a brake actuating pin 532 projecting from the near side of the positioner drive 263.

Referring to FIGS. 1A and 8A, the bonding agent applicator A' includes a bonding agent container 591 mounted in a compartment 593 formed rearwardly of the motor 219. The container 591 includes a resilient needle valve receiver 595 for receiving a needle valve, similar to a football needle valve, to fill such container with bonding agent. A relief valve 597 is mounted in the upper portion of the container 591 for relieving pressure therefrom as such container is filled. A bonding agent conduit 601 leads from the front end of the container 591 to the rear end of a bonding agent valve, generally designated 605 (FIG. 8A). Still referring to FIG. 1A, a pivotal tube 607 is connected with the rear extremity of the conduit 601 and has its lower extremity formed with an inlet and weighted by a weight 609 whereby such tube will hang downwardly in the container 591 regardless of the orientation thereof.

Referring to FIG. 8A, the valve 605 includes a Teflon housing 613 formed with a vertical bore 615 that receives a vertical plunger 617. The vertical plunger is formed on its lower extremity with a reduced-in-diameter portion 619 which cooperates with the bore 615 to form a metered chamber 621 which may be selectively aligned with the inlet tube 601 to receive a charge of bonding agent and then with the outlet tube 188 to discharge such bonding agent. The upper extremity of the plunger 617 is connected with the rear extremity of a bell crank shaped valve actuator, generally designated 625, which is pivotally mounted from the housing 25 at 627. A tension spring 631 biases the rear extremity of the horizontal arm of the actuator 625 downwardly and the downwardly projecting arm is formed on its upper extremity with a forwardly projecting tit 635 and on its lower extremity with a forwardly projecting portion 637, such tit and portion being selectively engaged by the valve actuating pin 533 projecting from the positioner drive 263.

OPERATION OF THE DEVICE E′

Operation of the device E′ is quite similar to operation of the device E and is initiated by rocking the switch 77 forwardly to close and lock the gate 53 and energize the motor 219 to initiate rotation of the shaft 233 (FIG. 7A) to drive the drive wheel 491. Again, the drive idler 135 holds the tape in frictional engagement with the O-ring 495 in the drive wheel 491 to cause such tape to be fed around the track R to project the leading edge through the clamp C.

As feed out of the tape T is nearly completed, the timing mechanism 441 will have advanced sufficiently to have moved the stop 237 on the gear 225 into engagement with the ear 449 to advance the washer 445 through its turn and engage it with the rim portion 445 of the sandwiched washer 441 to advance such washer 441 sufficiently to rotate the ear 463 on the integral gear 461 into engagement with the counterclockwise end of the notch 467 in the main drive gear 469 to commence rotation thereof thereby commencing clockwise rotation of the main drive 261.

After a slight amount of counterclockwise rotation of the main drive 261, the positioner drive 263 will be rotated sufficiently to engage the hold plate actuating pin 525 with the downwardly projecting tit 541 of the hold arm 535 to thereby pivot such arm and raise the lip 537 from engagement with the hold plate 521 at 539 thus freeing such hold plate to be rotated counterclockwise under the influence of its biasing spring to the extent dictated by the length of the notch 527. Such rotation will be sufficient to raise the plunger actuating pin 531 sufficiently to enable the plunger 99 to move forwardly to a position slightly spaced from the tines 103 and 105 corresponding to the position shown in FIG. 15 whereby a path will be formed between such tines and the plunger for receipt of the leading extremity of the tape as it is fed around the track R.

Rotation of the positioner drive 263 engages the pin 147 on the drive D and moves the drive idler 135 out of engagement with the drive wheel 491 to discontinue tape feed out.

Referring to FIG. 8A, immediately after the feed out of the tape T has been discontinued, the positioner drive 263 will have been rotated sufficiently clockwise to bring the brake actuating pin 53 upwardly out of the path of the rearwardly turned portion 583 of the actuator 581 to enable such actuator to rotate counterclockwise thereby permitting the dog 561 to rotate clockwise and bring the holding edge 563 upwardly into engagement with the tape T to hold it frictionally against the upper wall of the track 31.

Figure 19:
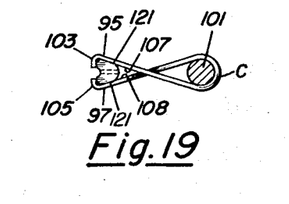
FIG. 19 is a top view of the clamp shown in FIG. 18, the view being taken along the line 19—19 of FIG. 18.

Concurrently with actuation of the brake B′, the clamp C is closed by the positioner drive 263 moving sufficiently far clockwise to enable the holding plate 521 to be carried sufficiently far clockwise to move the clamp actuating pin 531 out of the path of the rearwardly projecting arm 117 of the plunger 99 thereby enabling the plunger 99 to move forwardly against the tape disposed behind the tines 103 and 105, in a position corresponding with that shown in FIG. 19.

At this point in the operation, the positioner idler gear 471 will have been rotated sufficiently by the first gear segment 273 of the positioner drive 263 to rotate the positioner P into position with the forwardly projecting finger 199 engaged with the feed tape overlying the leading extremity of the tape in a position corresponding to that shown in broken lines in FIG. 11. Concurrent with disengagement from the gear portion 273, the cam surface 281 (FIG. 7A) will engage the cam surface 483 of the retainer 479 to move the index 477 upwardly to engagement with the notch 475 in the hub 473 of the positioner idler gear 471 to maintain the positioner P in the position described.

Thereafter, the tightener D will move the drive idler 135 into engagement with the tape T to draw the tape back from the track R to tighten it around the wires W (FIG. 4A).

It is noted that during the early portion of the forward cycle, the plunger 617 (FIG. 8A) of the bonding agent valve 605 was driven downwardly by the valve actuating pin 533 engaging the upper tit 635 on the valve actuator 625 thereby driving the plunger 617 downwardly to the position shown to register the chamber 621 with the inlet tube 601 to receive bonding agent from the pressurized container 591. As the device D′ approaches completion of its forward cycle, the valve actuating pin 533 will engage the forwardly facing surface 637 on the lower extremity of the actuator 625 to rotate such actuator counterclockwise and raise the plunger 617 to register the cavity 621 with the bonding agent outlet tube 188 thereby discharging the agent out the outlet 113 and onto the outer surface of the leading extremity of the tape T which projects beyond the clamp C.

Figure 21:
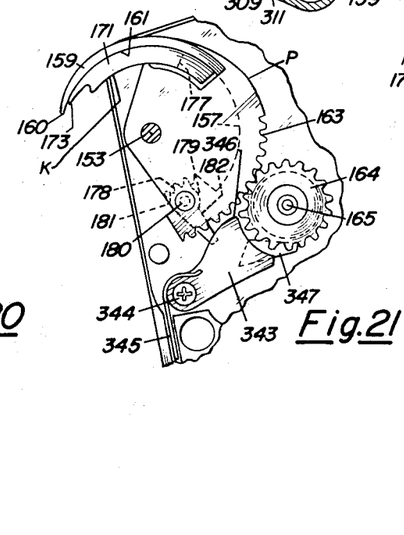
Figure 22:
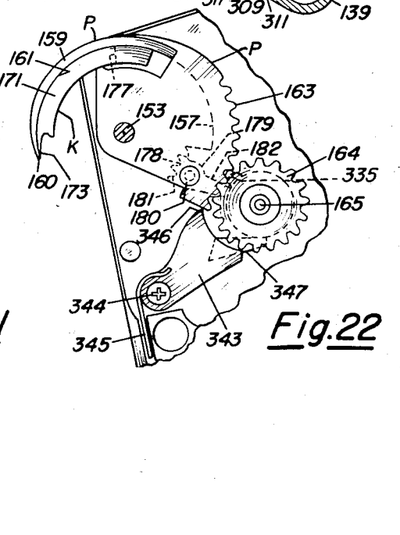

Thereafter, the cam surface 281 (FIG. 7A) will ride out from under the cam surface 483 of the retainer 479 thereby permitting the index 477 to disengage the V-notch 475 of the positioner idler gear 471 and concurrently engaging the second gear segment 475 of the positioner drive 263 with such idler 471 and driving the positioner P further forward to a position pressing the overlying feed tape against the leading extremity of the feed tape which projects beyond the clamp C in a position corresponding with that shown in FIG. 21.

At the end of the forward cycle of the device E′, the ear 447 of the timing washer 443 will be moved into engagement with the forwardly projecting arm 429 of the brake lever 421 thereby rocking such brake lever clockwise and lowering the free end of the brake plate 411 to engage the projecting arm 433 with the microswitch 435 and discontinuing current to the motor 219. Lowering the free end of the brake plate 411 will likewise frictionally brake the brake collar 407 to prevent further rotation of the bevel gear 221 thereby locking the mechanism M′ in its stopped condition and holding the positioner P in position with the forwardly projecting finger 159 maintaining the overlapping portions of the tape pressed together.

The current is then reversed to the motor 219 by rocking the switch 77 rearwardly to open the gate 53 and commence the reverse cycle. Rocking the switch 77 rearwardly to the reverse position rotates the gate actuator 63 (FIG. 4A) counterclockwise to move the hold rod 555 upwardly into engagement with the cantilever spring 39 to press such spring upwardly and hold the tape T against undesired retraction into the housing 25 whereby such tape will be properly indexed for the subsequent feed out cycle. It will be noted that the brake collar 47 is mounted on roller bearings and enables the motor 219 to take approximately on full revolution in the reverse direction before the cogs 403 and 405 engage to commence reversal of the mechanism M'. As soon as the reverse cycle is commenced, the timing mechanism 441 will be reversed thereby relieving pressure on the rear extremity of the arm 429 of the brake lever 421 to release said brake and permit free reverse rotation. After the gear 225 and timing washer 445 have completed their reverse turns, the sandwiched washer 451 will be engaged to commence reverse turning of the integral gear 461 and initiate clockwise turning of the cutter idler gear 341 to bring the strip 503 on the sleeve 501 into engagement with the dog 507 carried on the cutter K. It will be clear that during forward moving of the positioner P, the cutter K was moved forwardly causing the dog 507 to be rotated downwardly disposing its rear extremity in the path of the strip 503 whereby the consequent engagement will kick the cutter K forward to effect shearing of the tape T on the upper edge 42 of the front end of the tape support 37.

Near the end of the reverse cycle, the clamp actuating pin 531 (FIG. 7A) carried from the hold plate 521 will engage the rearwardly projecting arm 117 of the plunger 99 to rotate such plunger clockwise and bring it into engagement with the angled portions 107 and 108 of the tine 95 and 97 to spread the tines to a position corresponding with that shown in FIG. 17 to enable the tape T to pass therebetween when the device D' is removed from the bundled objects. The motor 219 is rendered inoperable at the end of the reverse cycle by the ear 447 engaging the arm 429 and driving the lever 421 upwardly to pivot the brake plate 411 counterclockwise thereby opening the microswitch 436 and braking the collar 407.

From the foregoing, it will be apparent that the device E and E' of present invention provide a convenient and advantageous means for bundling a plurality of objects in a bundle.

I claim:

1. A tying device for binding a plurality of objects together, said device comprising:
    a frame including a tape track formed to substantially encompass said objects;
    tape feed means supported by said frame for driving a predetermined length of tape around said track;
    a clamp mounted on said frame and including at least one jaw formed with a tine for extension in front of the lead extremity of said tape, a clamp head positioned behind said tape, opposite said jaw, and clamp actuating means for clamping said head and tine firmly on said extremity;
    an applicator supported by said frame for applying a bonding agent to the back surface of the leading extremity;
    tightener means supported by said frame for tightening the tape around said objects and pressing a portion of the feed tape onto said back surface of said leading extremity while said bonding agent dries;
    a cutter supported by said frame for cutting the feed tape from the tape wrapped around said objects;
    control means for sequentially actuating the tape feed means, clamp actuating means, tightener means, applicator and cutter; and
    a motor for driving said control means whereby said objects may be positioned in said track, said feed means actuated to feed said predetermined length of tape around said track and drive said lead extremity between said tine and head, said clamp actuated to clamp said lead extremity firmly between said tine and head, said applicator actuated to apply said bonding fluid to said back surface of said lead extremity, said tightener actuated to tighten a loop of tape around said objects and press said feed tape firmly onto said back extremity to bundle said objects tightly together into a compact bundle and said cutter actuated to cut the tape looping said object free from the feed tape.

2. A tying device as set forth in claim 1 wherein:
    said tape feed means drives said leading extremity of said tape beyond said clamp; and
    said device includes a positioner driven by said control means to press said leading extremity inwardly during operation of said tightener to prevent the excess tape being drawn from said track from doubling said extremity back in the direction of tape withdrawal.

3. A tying device as set forth in claim 1 that includes:
    a brake for engaging the feed tape at a point spaced from said clamp; and
    said tightener means engages said feed tape intermediate said brake and track and moves the engaged tape transversely to draw said excess tape from said track.

4. A tying device as set forth in claim 1 wherein: said cutter includes a pair of shearing edges, one of said shearing edges being angled with respect to the other to effect progressive shearing of said tape.

5. A tying device as set forth in claim 1 wherein: said frame forms a housing of hand hold size.

6. A tying device as set forth in claim 1 wherein:
    said frame is formed with a tape spool compartment and a tape channel extending from said compartment to said track; and
    a tape spool supported rotatably in said compartment.

7. A tying device as set forth in claim 1 that includes: a resilient tape guide supported adjacent the point of entry of said tape to said track for directing the entering tape into said track and sufficiently resilient to release in response to the tightening force on said tape to release said tape.

8. A tying device as set forth in claim 1 wherein:
    said control means is reversible to be returned to the beginning of a cycle when a forward cycle is completed;
    said applicator includes a normally open valve having an actuator; and
    said control means includes a freely rotatable idler cam carried from said housing and formed with an arcuate peripheral working surface for holding said valve closed and having a peripheral notch therein and an actuator cam including finger received in said notch and having a peripheral surface for selective engagement with said valve to maintain said valve closed and valve opening means for rotating said actuator cam in one direction to engage said finger with one end of said notch to register the unoccupied portion of said notch with said actuator to enable said actuator to project into said notch thereby permitting said valve to open, said valve opening means then continuing rotation of said actuator cam to rotate said notch out of engagement with said actuator to raise said actuator on said working surface, said opening means being effective during the reverse cycle to rotate said actuating cam in the direction opposite said one direction to engage the end of said notch opposite said one end to rotate said idler cam and rotate said finger into registration under said actuator to prevent actuation of said valve.

9. A tying device as set forth in claim 2 that includes: a lock for locking said positioner into position pressing the overlying portions of said tape together during actuation of said cutter.

10. A tying device as set forth in claim 1 wherein: said track includes a gate moveable with respect to the rest of said track whereby said track may be opened to receive said objects.

11. A tying device as set forth in claim 1 wherein said motor is reversible and that includes: means responsive to a selected position of said control mechanism to render said motor inoperable.

12. A tying device as set forth in claim 1 that includes: a control switch for actuating said control means; and hold means coupled with said switch and responsive to a selected position thereof for engaging and holding said feed tape against accidental withdrawal into said frame.

13. A tying device as set forth in claim 1 wherein:
said frame is formed with a container-receiving compartment; and
said applicator includes a container disposed in said compartment and a conduit leading therefrom and terminating in a nozzle disposed adjacent said clamp for spraying said agent on said tape.

14. A tying device as set forth in claim 1 wherein: said applicator includes a valve having a body formed with an elongated open ended passage and offset inlet and outlet ports extending transversely from said passage, said valve further including a plunger shaped to closely fit said passage and formed with a reduced in-cross section portion for selective registration with said inlet port to receive a measured quantity of bonding agent and then with said outlet port to eject said measured quantity and means for reciprocating said plunger.

15. A tying device as set forth in claim 1 that includes: a brake responsive to a selected position of said control mechanism to brake said control mechanism.

16. A tying device as set forth in claim 1 wherein:
said clamp includes a first position for accepting said tape, a second position for clamping said tape and a third position for releasing said tape; and
said clamp actuating means includes means for sequentially actuating said clamp to the three positions.

17. A tying device as set forth in claim 11 that includes: a brake responsive to said selected position of said control mechanism to brake said control means against movement while said motor is inoperable.

18. A tying device as set forth in claim 13 wherein: said container includes a freely moveable pick-up conduit for movement to project downwardly into the bonding agent in said container when said device is overturned.

19. A tying device as set forth in claim 1 wherein: said clamp includes a second jaw formed with a tine confronting said first mentioned tine and means for spreading said tines apart after the tying process is complete to enable the tape looping said objects to pass therebetween.

20. A tying device as set forth in claim 19 wherein:
said jaws are formed with inwardly and rearwardly angling rear portions and said plunger is disposed therebetween; and
said control means moves said plunger forwardly against said tines to clamp said tape and rearwardly against said angled portions for spreading of said tines for removal therebetween of said tape.

21. A tying device as set forth in claim 19 wherein: said control means moves said plunger to an intermediate position during feeding of said tape to enable said tines to hold said tape captive therebehind while forming a tape path between said plunger and tines.

22. A portable tying device for tying a plurality of objects together, said device comprising:
a frame including a track formed to substantially encompass said objects;
feed means for feeding a predetermined length of a relatively stiff binding member around said track;
a clamp including at least one jaw formed with a tine for extension in front of the lead extremity of said binding member, a clamp head disposed on the back side of said extremity opposite said tine and clamp actuating means for actuating said clamp to clamp said head and tine firmly on said extremity;
tightener means for drawing said binding member from said track and drawing a feed portion thereof adjacent said extremity;
fastening means for fastening the lead extremity of said binding member to said feed portion;
a cutter supported by said frame for cutting the feed portion of said binding member from that looped around said objects;
control means for sequentially actuating said feed means, clamp, tightener means, fastening means and cutter; and
a motor for driving said control means whereby said objects may be positioned in said track, said feed means actuated to feed said predetermined length of binding member around said track to drive said lead extremity between said head and tine, said clamp actuated to clamp said lead extremity firmly between said head and tine, said tightener actuated to draw said binding member from said track to tighten a loop firmly around said objects while said extremity is gripped firmly between said head and clamp, said fastening means actuated to fasten said feed portion to said lead extremity and said cutter actuated to cut the binding member looping said objects to free said device from said objects.

References Cited

UNITED STATES PATENTS

| | | | |
|---|---|---|---|
| 2,344,340 | 3/1944 | Adams | 156—468X |
| 2,361,470 | 10/1944 | Flood | 156—215X |
| 2,834,499 | 5/1958 | Semkow | 156—522X |
| 2,982,069 | 5/1961 | England | 53—198 |
| 3,057,648 | 10/1962 | Schwarze et al. | 100—26X |

BENJAMIN A. BORCHELT, Primary Examiner

J. M. HANLEY, Assistant Examiner

U.S. Cl. X.R.

156—212, 468, 495, 526; 100—26